E. A. MARSH.
Lathe for Turning Regular Forms.

No. 209,064.  Patented Oct. 15, 1878.

Witnesses.  
D. B. Burnham  
Frank Beach

Inventor.  
E. A. Marsh.

UNITED STATES PATENT OFFICE.

ELON A. MARSH, OF BATTLE CREEK, MICHIGAN.

IMPROVEMENT IN LATHES FOR TURNING REGULAR FORMS.

Specification forming part of Letters Patent No. 209,064, dated October 15, 1878; application filed August 12, 1876.

*To all whom it may concern:*

Be it known that I, ELON A. MARSH, of Battle Creek, in the county of Calhoun and State of Michigan, have invented a new and useful Improvement in Lathes; and I do hereby declare that the following is a full, clear, and exact description of the same.

The invention relates to an improvement in lathes of the common class; and consists in the construction and arrangement of parts, as hereinafter described and claimed.

Figure 1:
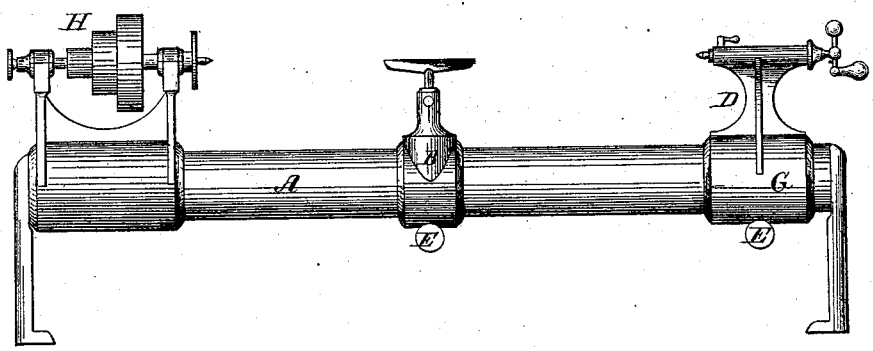
Figure 2:
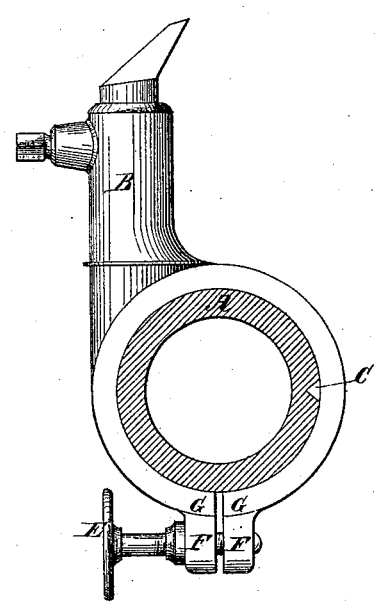
Figure 3:
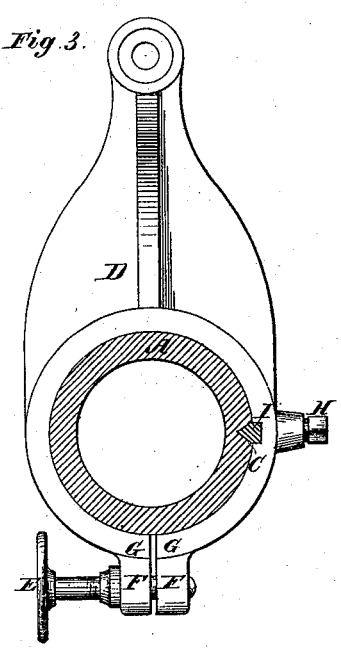

In the accompanying drawings, forming part of this specification, Figure 1 is a side elevation, and Figs. 2 and 3 different vertical cross-sections of the same.

The bed A of the lathe is cylindrical in form, and provided with a lengthwise groove, C, in one side. The sliding tool-rest B and tail-stock D have semicircular jaws G G, which embrace and closely fit the bed A, and may be tightened or caused to bite the same by means of screws E for the purpose of securing the tool-rest and tail-stock in any adjustment. Said screw passes through pendent arms or lugs F formed on the lower ends of the jaws G. By turning it in one direction the jaws will be relaxed so as to permit the tool-rest and tail-stock to be slid along the bed to the desired point, and by turning the screw in the opposite direction the jaws will be tightened around the bed and clamp the tool-rest and tail-stock firmly in place.

The tail-stock requires to be held always in a vertical position, whatever may be its local relation otherwise to the head-stock H. For this purpose I employ a feather, I, Fig. 3, which is secured in a suitable recess in one of the jaws G, and travels in the lengthwise groove C in bed A.

The screw H serves to adjust the feather to compensate for wear in the groove. Said screw works in a boss formed on the jaw G, and its inner end abuts the latter.

I do not claim a lathe having a cylindrical bed; nor do I claim, broadly, securing the movable parts of a lathe by means of a screw and clamping-jaws; but

What I claim is—

In combination with the cylindrical bed A, having the lengthwise groove C, the tail-stock having jaws G G, the screw E, and the feather I and set-screw H, all combined and arranged as shown and described, for the purpose specified.

ELON A. MARSH.

Witnesses:
   D. B. BURNHAM,
   FRANK BEACH.